US012200837B2

(12) United States Patent
Tang et al.

(10) Patent No.: US 12,200,837 B2
(45) Date of Patent: Jan. 14, 2025

(54) LED DRIVER DIMMING CONTROL

(71) Applicant: TEXAS INSTRUMENTS INCORPORATED, Dallas, TX (US)

(72) Inventors: Yichao Tang, Shanghai (CN); Jiana Lou, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 105 days.

(21) Appl. No.: 18/150,839

(22) Filed: Jan. 6, 2023

(65) Prior Publication Data

US 2024/0237169 A1 Jul. 11, 2024

(51) Int. Cl.
*H05B 45/325* (2020.01)
*H05B 45/10* (2020.01)

(52) U.S. Cl.
CPC ........... *H05B 45/325* (2020.01); *H05B 45/10* (2020.01)

(58) Field of Classification Search
CPC ...... H05B 45/10; H05B 45/325; H05B 45/46; H05B 45/355; H05B 45/375; H05B 45/38; H05B 45/385; H05B 45/397; H05B 47/10; H05B 45/3725; H05B 45/382; H05B 45/39; H05B 45/42; G06F 1/26; G06F 1/3203
See application file for complete search history.

(56) References Cited

U.S. PATENT DOCUMENTS

2020/0256521 A1* 8/2020 Xiong ...................... H05K 1/00
2023/0109205 A1* 4/2023 Xiong ..................... F21V 25/04
315/127

* cited by examiner

*Primary Examiner* — Monica C King
(74) *Attorney, Agent, or Firm* — Charles F. Koch; Frank D. Cimino

(57) ABSTRACT

A light emitting diode (LED) dimming circuit includes an amplifier, a switch, a pulse extension circuit, and a reference shaping circuit. The amplifier has an amplifier output, a first amplifier input, and a second amplifier input. The first amplifier input is coupled to a current sense terminal. The switch has a first switch terminal, a second switch terminal, and a switch control input. The first switch terminal is coupled to the amplifier output. The pulse extension circuit has an extended pulse output and a pulse input. The extended pulse output is coupled to the switch control input. The pulse input is coupled to a pulse width modulation (PWM) terminal. The reference shaping circuit has a reference input and reference control input. The reference input is coupled to the second amplifier input. The reference control input is coupled to the PWM terminal.

21 Claims, 8 Drawing Sheets

LED DRIVER DIMMING CONTROL

BACKGROUND

LED lighting provides a number of advantages over incandescent and fluorescent lighting systems. For a given illumination, LED lighting consumes less power than other lighting technologies while providing faster response and lower electro-magnetic interference. Accordingly, LED lighting is used in a wide variety of illumination applications. A number of regulation techniques are employed in LED lighting systems. For example, an LED driver circuit may use constant-current regulation, constant-voltage regulation, or a combination thereof, to control LED illumination. Many LED driver circuits include circuitry that enables dimming of the light output to provide a range of illumination intensity. The dimming can be implemented using analog circuitry (e.g., a variable series or shunt resistance) to set the current flowing through the LEDs, or using pulse-width-modulation of a DC-DC converter to set the LED current. Typically, the analog circuitry causes extra power loss and system cost while the DC-DC converter has low dimming accuracy with conventional dimming control.

SUMMARY

In one example, a light emitting diode (LED) dimming circuit includes an amplifier, a switch, a pulse extension circuit, and a reference shaping circuit. The amplifier has an amplifier output, a first amplifier input, and a second amplifier input. The first amplifier input is coupled to a current sense terminal. The switch has a first switch terminal, a second switch terminal, and a switch control input. The first switch terminal is coupled to the amplifier output. The pulse extension circuit has an extended pulse output and a pulse input. The extended pulse output is coupled to the switch control input. The pulse input is coupled to a pulse width modulation (PWM) terminal. The reference shaping circuit has a reference input and reference control input. The reference input is coupled to the second amplifier input. The reference control input is coupled to the PWM terminal.

In another example, an LED dimming circuit includes an amplifier, a pulse extension circuit, a switch, and a reference shaping circuit. The amplifier has an amplifier output, a first amplifier input, and a second amplifier input. The first amplifier input is coupled to a current sense terminal. The pulse extension circuit has a pulse input and a pulse output. The pulse input is coupled to a PWM terminal. The pulse extension circuit is configured to provide, at the pulse output, an extended PWM pulse by delaying a trailing edge of a PWM pulse received at the pulse input. The switch has a switch terminal and a switch control input. The switch terminal is coupled to the amplifier output. The switch control input is coupled to the pulse output. The reference shaping circuit has a reference input and a reference control input. The reference input is coupled to the second amplifier input. The reference control input is coupled to the PWM terminal. The reference shaping circuit is configured to draw current from the second amplifier input responsive to the PWM pulse.

In a further example, an LED circuit includes an LED and an LED driver. The LED driver includes a drive output, a sense resistor, and an LED dimming circuit. The drive output is coupled to the LED. The sense resistor has first and second resistor terminals. The first resistor terminal is coupled to the drive output. The LED dimming circuit includes an amplifier, a switch, a pulse extension circuit, and a reference shaping circuit. The amplifier has an amplifier output, and first and second amplifier inputs. The first amplifier input is coupled to the first resistor terminal. The second amplifier input is coupled to the second resistor terminal. The switch has a switch terminal and a switch control input. The switch terminal is coupled to the amplifier output. The pulse extension circuit has an extended pulse output and a pulse input. The extended pulse output is coupled to the switch control input. The pulse input is coupled to a PWM terminal. A reference shaping circuit has a reference input and a reference control input. The reference input is coupled to the second amplifier input. The reference control input is coupled to the PWM terminal.

DETAILED DESCRIPTION

Figure 1:
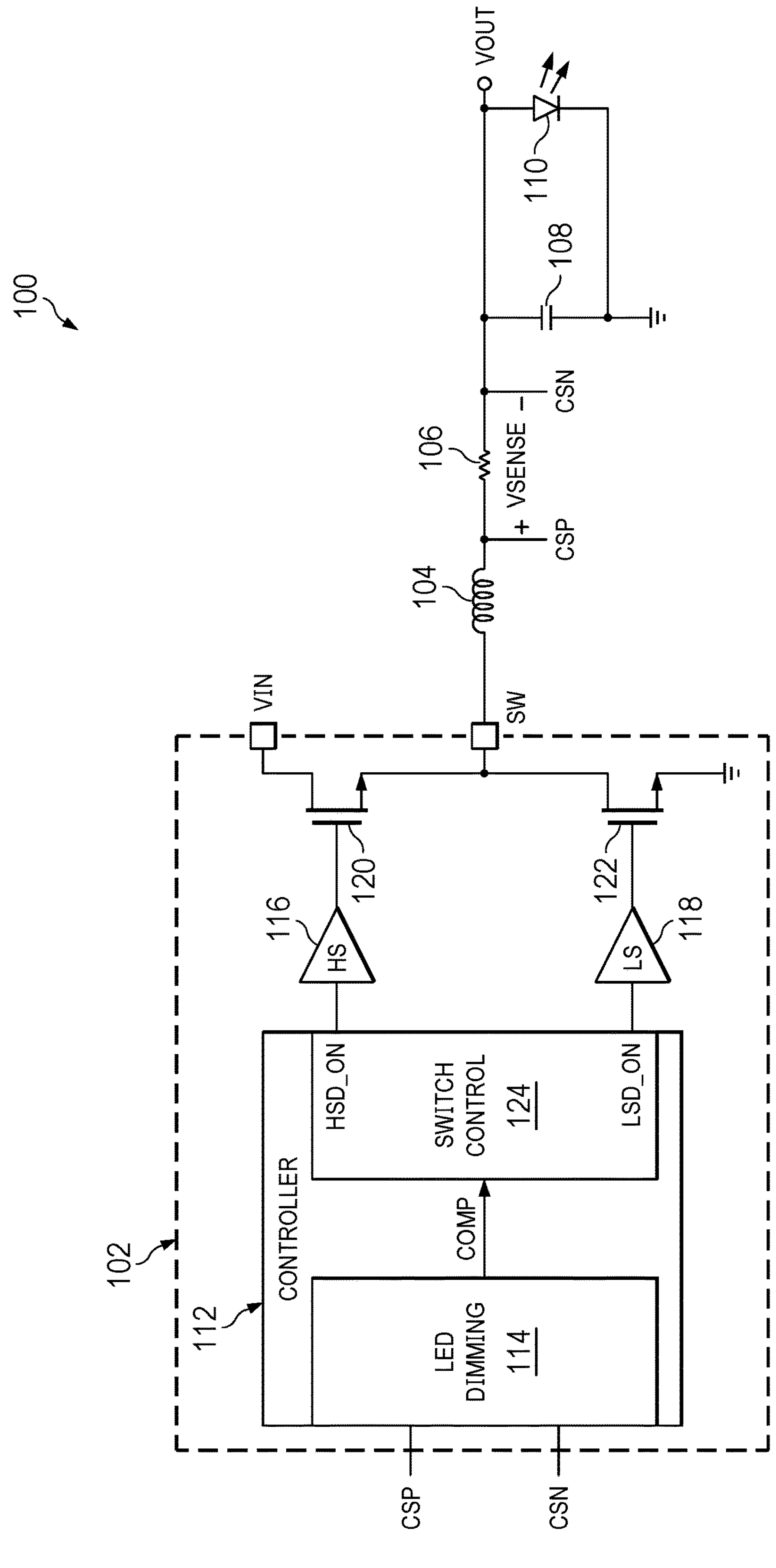
FIG. 1 is a block diagram of an example buck-mode light emitting diode (LED) driver circuit.

FIG. 1 is a block diagram of an example buck-mode light emitting diode (LED) driver circuit 100. The buck-mode LED driver circuit 100 includes an LED driver 102, an inductor 104, a resistor 106, an output capacitor 108. An LED 110 is coupled to a drive output of the buck-mode LED driver circuit 100 to form an LED circuit. In practice, the buck-mode LED driver circuit 100 may include more than one LED. The inductor 104 is coupled between an output of the LED driver 102 and a first terminal of the resistor 106. An anode of the LED 110 is coupled to a second terminal of the resistor 106, and cathode of the LED 110 is coupled to a ground terminal. The output capacitor 108 is coupled between the second terminal of the resistor 106 and the ground terminal.

The LED driver 102 charges the inductor 104 to step-down an input voltage (VIN) received at an input of the LED driver 102, and provide an output voltage/current for driving the LED 110. The voltage dropped across the resistor 106 is representative of the current flowing through the LED 110. The first and second resistor terminals of the resistor 106 are coupled to inputs of the LED driver 102 to provide the feedback voltage (VSENSE) for use in controlling the LED driver 102.

The LED driver 102 includes a controller 112, a high-side driver 116, a low-side driver 118, a high-side transistor 120, and a low-side transistor 122. The high-side transistor 120 and the low-side transistor 122 may be n-channel FETs (NFETs) in some implementations of the LED driver 102. The high-side transistor 120 includes a first current terminal (e.g., drain) coupled to a voltage input of the LED driver 102, and a second current terminal (e.g., source) coupled to an output (SW) of the LED driver 102. A control terminal (e.g., gate) of the high-side transistor 120 is coupled to the controller 112 via the high-side driver 116. The low-side transistor 122 includes a first current terminal (e.g., drain) coupled to the second current terminal of the high-side transistor 120, and a second current terminal (e.g., source) coupled to the ground terminal. A control terminal (e.g., gate) of the low-side transistor 122 is coupled to the controller 112 via the low-side driver 118. The high-side driver 116 and the low-side driver 118 provide drive signals to the high-side transistor 120 and low-side transistor 122 with voltage and current suitable for controlling switching of the high-side transistor 120 and the low-side transistor 122.

The controller 112 controls switching of the high-side transistor 120 and low-side transistor 122 to provide the current that powers the LED 110. The controller 112 includes an LED dimming circuit 114 that enables/disables switching of the high-side transistor 120 and the low-side transistor 122 to vary the current provided to the LED 110 as needed to achieve a desired level of illumination (to dim the LED 110 to achieve the desired level of illumination). The LED dimming circuit 114 includes a sampling circuit that senses the current flowing through the resistor 106 (and the LED 110), and outputs a signal (COMP) representative a difference between the sensed current and a reference current. A switch control circuit 124 applies the signal COMP provided by the sampling circuit to control the high-side transistor 120 and low-side transistor 122 and produce the desired level of illumination from the LED 110. Error in the signal COMP provided by the sampling circuit (error in the difference between the reference current and the sensed current) may limit the range and/or accuracy of the dimming provided by the controller 112.

Figure 2:
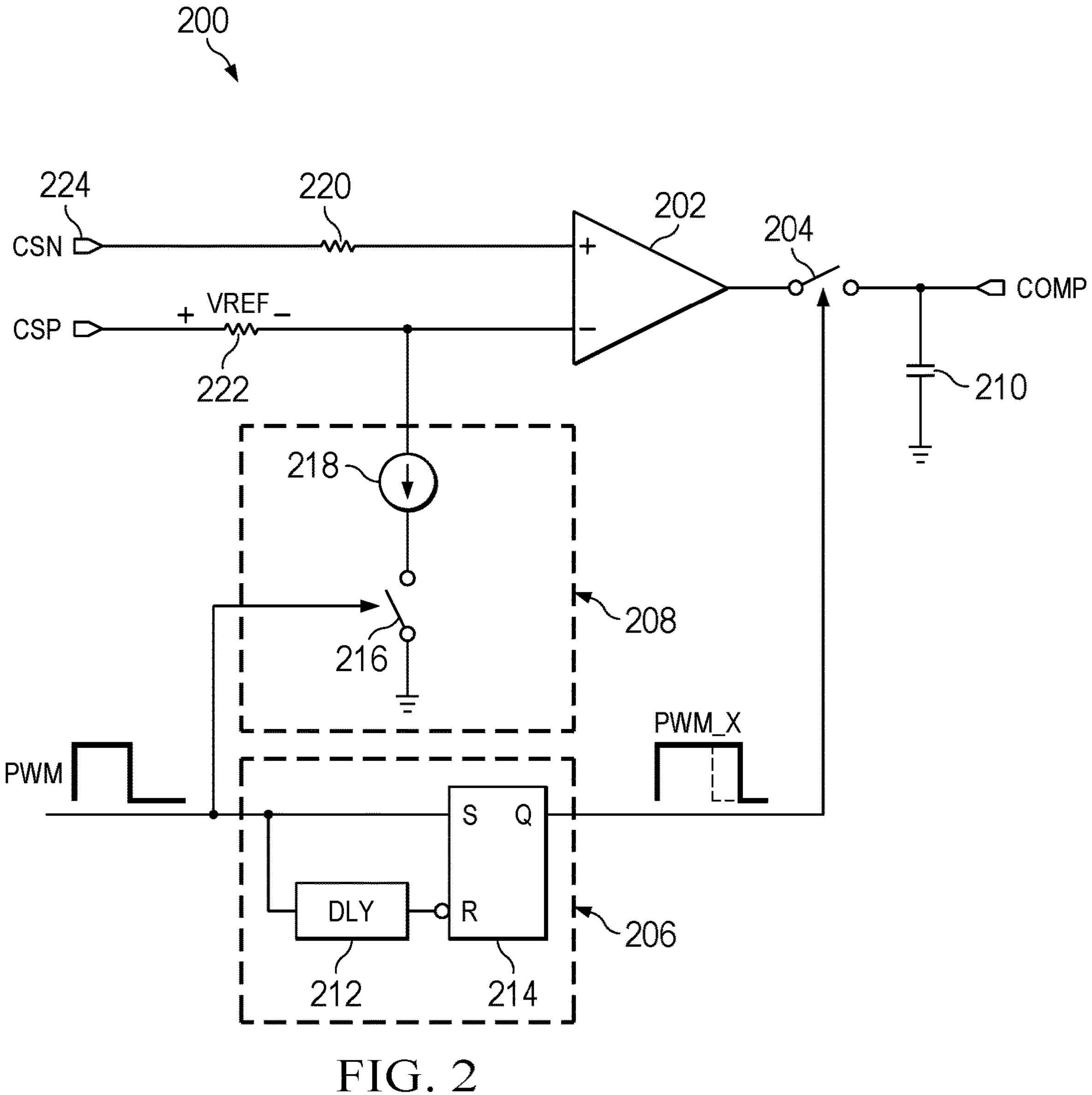
FIG. 2 is a block diagram of an example sampling circuit suitable for use in the buck-mode LED driver circuit of FIG. 1.

FIG. 2 is a block diagram of an example sampling circuit 200 suitable for use in the LED dimming circuit 114. The sampling circuit 200 includes an amplifier 202, a switch 204, a pulse extension circuit 206, a reference shaping circuit 208, a capacitor 210, a resistor 220, and a resistor 222. The resistor 220 is coupled between a first input (e.g., non-inverting input) of the amplifier 202 and the second terminal of the resistor 106 (or a current sense terminal 224). The resistor 222 is coupled between a second input (e.g., inverting input) of the amplifier 202 and the first terminal of the resistor 106. The output of the amplifier 202 (amplifier output) is coupled to a first terminal of the switch 204 (a first switch terminal). The amplifier 202 provides an output signal that is the difference of the signals at its inputs (e.g., the voltage across the resistor 106 (VSENSE) compared to a reference voltage (VREF)). A second terminal (a second switch terminal) of the switch 204 is coupled to the capacitor 210. The capacitor 210 is coupled between ground and the second terminal of the switch 204. A switch control input of the switch 204 is coupled to an output (an extended pulse output) of the pulse extension circuit 206.

The pulse extension circuit 206 controls the switch 204. The pulse extension circuit 206 closes the switch 204 to sample the output of the amplifier 202, and opens the switch 204 to hold the sample voltage across the capacitor 210. The sample voltage across the capacitor 210 (COMP) is provided to switch control circuit 124 of the controller 112 to adjust the timing of the transistor control signals HSD_ON and LSD_ON. An input (pulse input) of the pulse extension circuit 206 is coupled to a pulse width modulation (PWM) terminal or a PWM circuit for receipt of a PWM signal (PWM). The pulse extension circuit 206 delays the trailing edge of the PWM signal. The pulse extension circuit 206 includes a delay circuit 212 and a latch 214. The latch 214 includes a set input, a reset input, and an output. The output of the latch 214 is coupled to the control terminal of the switch 204. The delay circuit 212 delays the PWM signal by a selected delay time. The delay time may be programmable via a communication interface (e.g., a serial bus) or other selection means. An input of the delay circuit 212 is coupled to the PWM terminal and the set input of the latch 214. An output of the delay circuit 212 is coupled to the reset input of the latch 214. When the PWM signal is a logic high, the extended PWM pulse (PWM_X) provided by the latch 214 is logic high, and the switch 204 is closed. When the PWM signal is a logic low and the output of the delay circuit 212 is a logic low, PWM_X is a logic low, and the switch 204 is open. Accordingly, PWM_X is set to a logic high at the leading edge of the PWM signal and set to a logic low at the trailing edge of delayed PWM signal provided by the delay circuit 212. The switch 204 remains closed for the delay time after the trailing edge of the PWM signal. In some examples of the sampling circuit 200, the pulse extension circuit 206 may be configured to extend the PWM signal (delay the trailing edge of the PWM signal) by a time computed as:

$$T_{XT,BUCK} = \frac{1 - D_{SW,BUCK}}{F_{SW} \cdot \text{ripple}\%} \tag{1}$$

where:

$D_{SW,BUCK}$ is the duty cycle of HSD_ON;

$F_{SW}$ is the switching frequency of HSD_ON; and ripple % is the percentage ripple of the inductor current (IL).

The reference shaping circuit 208 is coupled between the second input of the amplifier 202 and a ground terminal. A reference input of the reference shaping circuit 208 is coupled to the second input of the amplifier 202. A reference control input of the reference shaping circuit 208 is coupled to the PWM terminal. An output of the reference shaping circuit 208 is coupled to the ground terminal. The reference shaping circuit 208 includes a current source 218 and a switch 216. A current input of the current source 218 is coupled to the second input of the amplifier 202. A current output of the current source 218 is coupled to a first terminal of the switch 216. A second terminal of the switch 216 is coupled to the ground terminal. A switch control input of the switch 216 is coupled to the PWM terminal. To shape the reference voltage provided at the second input of the amplifier 202, the switch 216 is closed when the PWM signal is a logic high, and the switch 216 is open to draw current from the second input of the amplifier 202 when the PWM signal is a logic low.

Figure 3A:
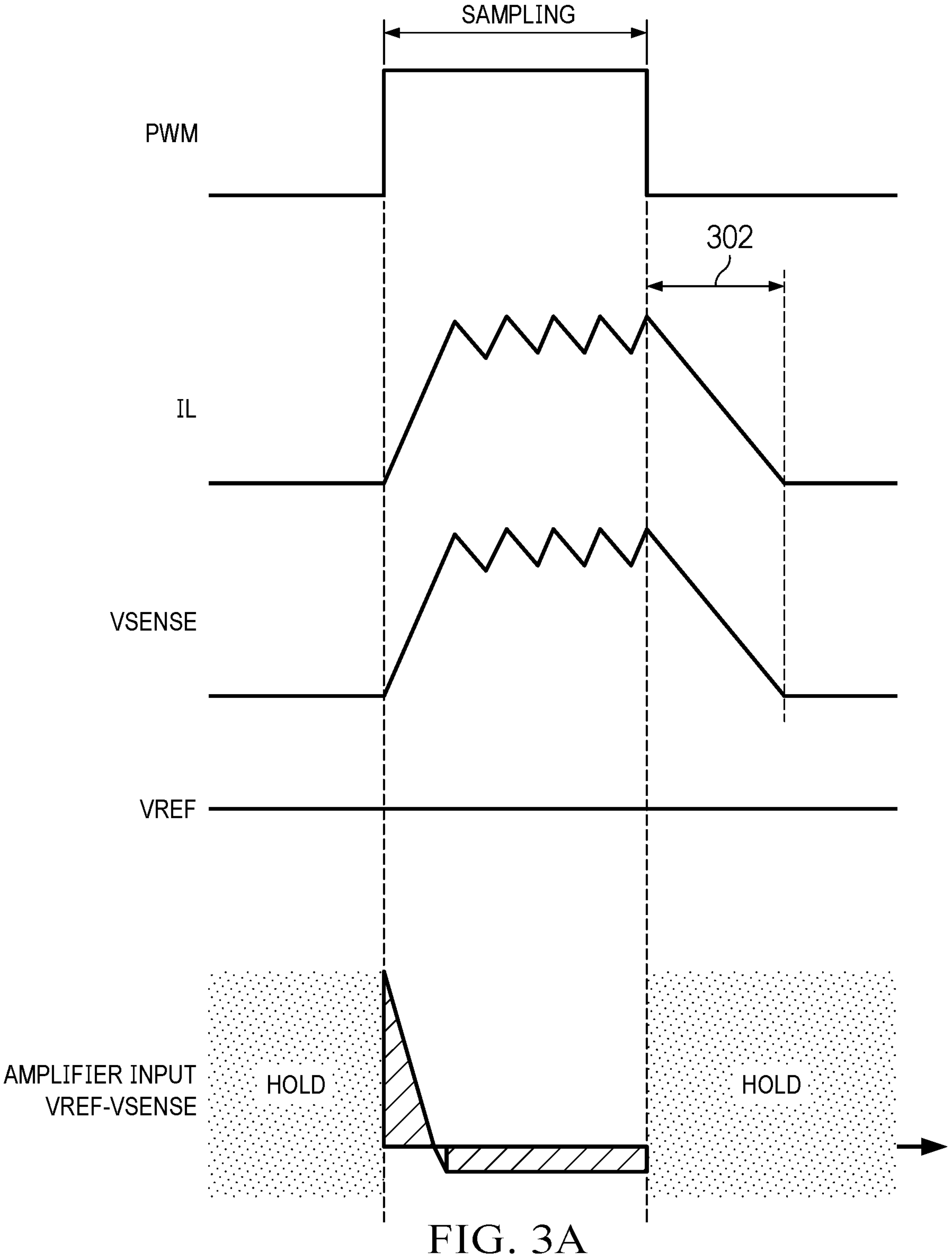
FIGS. 3A and 3B are timing diagrams illustrating sampling in a conventional sampling circuit and in the sampling circuit of FIG. 2.
Figure 3B:
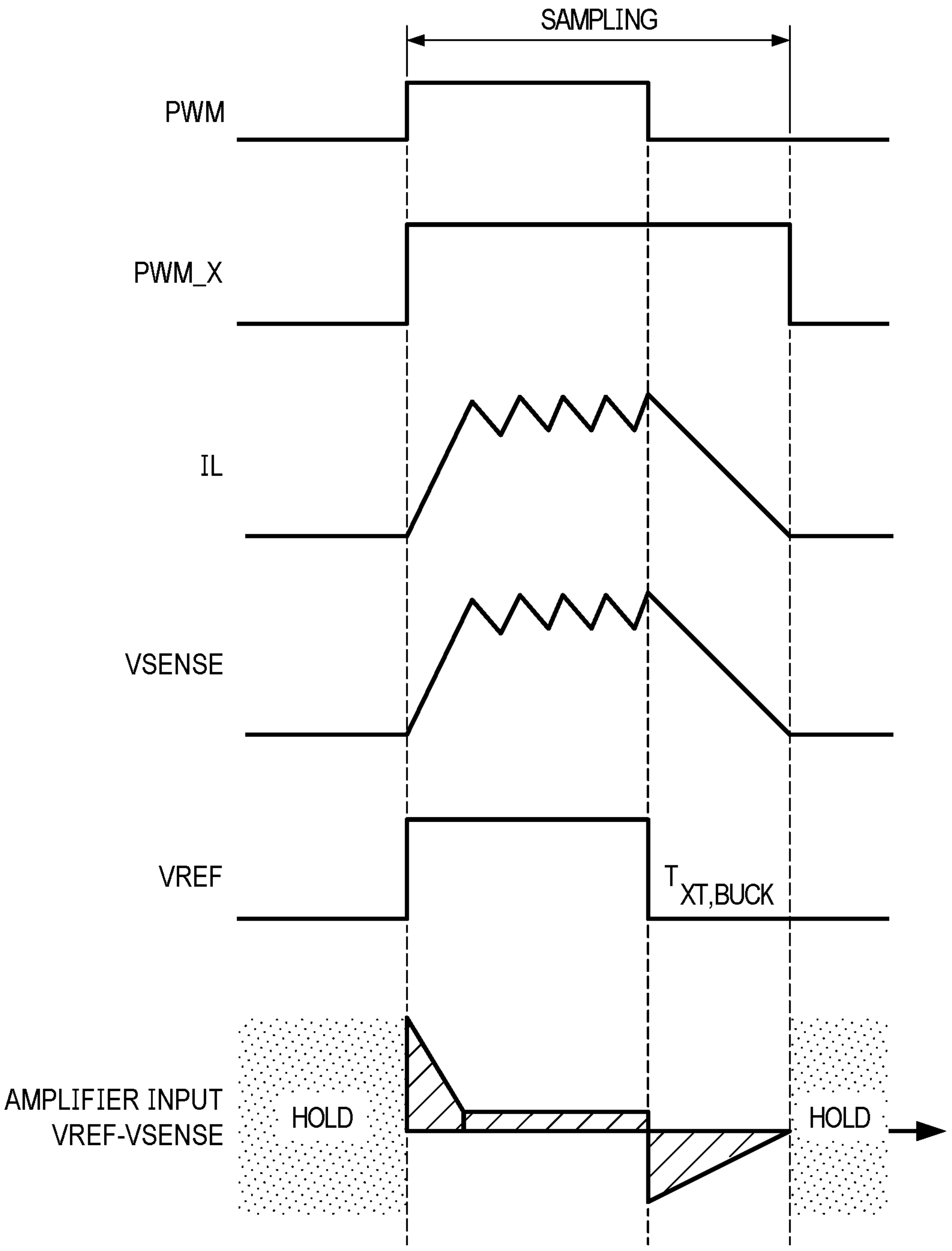

FIGS. 3A and 3B are timing diagrams illustrating sampling in a buck-mode LED driver circuit using a conventional sampling circuit and sampling in the boost-mode LED driver circuit 100 by the sampling circuit 200. FIG. 3A shows the PWM signal, the inductor current (IL), the voltage across the resistor 106 (VSENSE), the reference voltage (VREF) provided to the amplifier, and the difference between VREF and VSENSE in a conventional sampling circuit. When PWM is high, the difference between VSENSE and the reference voltage VREF is sampled. When PWM is low, the output of the amplifier is held on the sampling capacitor. However, after the falling edge of PWM (in interval 302), IL is non-zero for a time as the inductor discharges. The additional current flowing to the LED after the falling edge of PWM is not reflected in the sampled difference signal, leaving the sampled signal distorted and the regulated current (provided to the LED load based on the output of the amplifier) higher than desired.

FIG. 3B shows the PWM signal, the extended PWM signal (PWM_X), the inductor current (IL), the voltage across the resistor 106 (VSENSE), the shaped reference voltage (VREF) provided to the amplifier 202, and the voltage across the capacitor 210 in the sampling circuit 200. As in FIG. 3A, sampling begins at the leading edge of PWM. PWM_X, provided by the pulse extension circuit 206, extends the sampling interval by a time equal to or greater than the discharge time of the inductor 104 to account for the current flowing after the trailing edge of PWM. Accordingly, the entire charge delivered to the LED 110 is sampled. To limit reference current comparison to the duration of PWM, the reference shaping circuit 208 shapes the reference voltage VREF based on PWM and synchronizes the reference voltage VREF with the PWM signal at both rising and falling edges. The sampling circuit 200 senses the current flowing to the LED 110 more accurately than a conventional sampling circuit, which enable more accurate dimming and higher frequency PWM.

Figure 4:
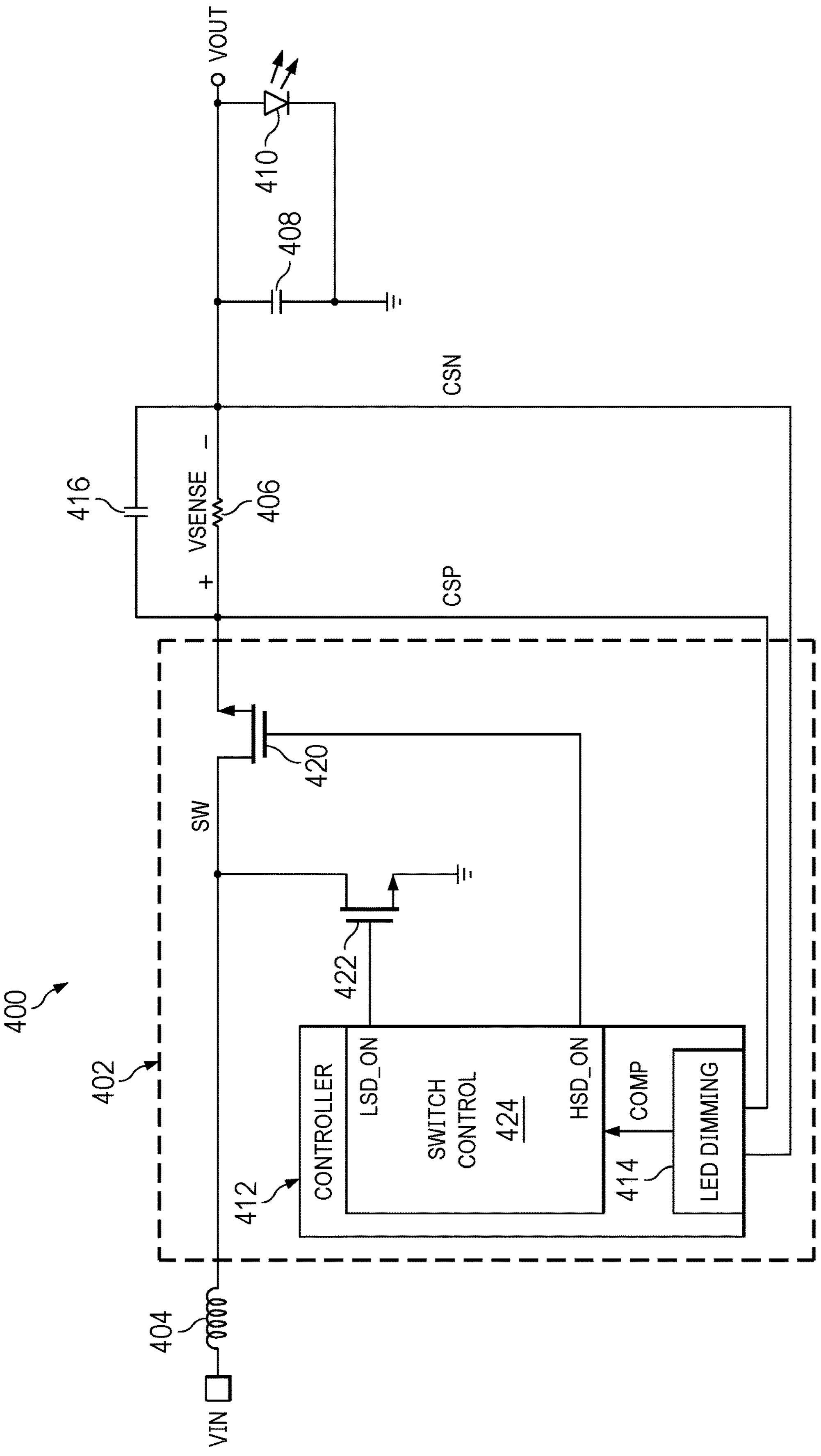
FIG. 4 is a block diagram of an example boost-mode LED driver circuit.

FIG. 4 is a block diagram of an example boost-mode LED driver circuit 400. The boost-mode LED driver circuit 400 includes an LED driver 402, an inductor 404, a resistor 406, an output capacitor 408, an LED 410, and a capacitor 416. In practice, the boost-mode LED driver circuit 400 may include more than one LED. An anode of the LED 410 is coupled to a first terminal of the resistor 406, and a cathode of the LED 410 is coupled to a ground terminal. The output capacitor 408 is coupled between the first terminal of the resistor 406 and the ground terminal.

The LED driver 402 charges the inductor 404 to step-up an input voltage (VIN) received at a first terminal of the inductor 404, and provide a boosted output voltage/current for driving the LED 410. The voltage dropped across the resistor 406 is representative of the current flowing through the LED 410. The capacitor 416 is coupled in parallel with the resistor 406 (first and second capacitor terminals of the capacitor 416 are coupled to first and second resistor terminals of the resistor 406). The first and second terminals of the resistor 406 are coupled to inputs of the LED driver 402 to provide the feedback voltage (VSENSE) for use in controlling the LED driver 402.

The LED driver 402 include a controller 412, a high-side transistor 420, and a low-side transistor 422. The high-side transistor 420 and the low-side transistor 422 may be NFETs in some implementations of the LED driver 402. The high-side transistor 420 includes a first current terminal (e.g., drain) coupled to a second terminal of the inductor 404, and a second current terminal (e.g., source) coupled to the second terminal of the resistor 406. A control terminal (e.g., gate) of the high-side transistor 420 is coupled to the controller 412 (e.g., via a gate driver circuit). The low-side transistor 422 includes a first current terminal (e.g., drain) coupled to the first current terminal of the high-side transistor 420, and a second current terminal (e.g., source) coupled to a ground terminal. A control terminal (e.g., gate) of the low-side transistor 422 is coupled to the controller 412 (e.g., via a gate driver circuit).

The controller 412 controls switching of the high-side transistor 420 and low-side transistor 422 to provide the current that powers the LED 410. The controller 412 includes a LED dimming circuit 414 that enables/disables switching of the high-side transistor 420 and the low-side transistor 422 to vary the current provided to the LED 410 as needed to achieve a desired level of illumination (to dim the LED 410 to achieve the desired level of illumination). The LED dimming circuit 414 includes a sampling circuit that senses the current flowing through the resistor 406 (and the LED 410), and outputs a signal (COMP) representative a difference between the sensed current and a reference current. A switch control circuit 424 applies the signal COMP to control the high-side transistor 420 and low-side transistor 422 to produce the desired level of illumination from the LED 410. Error in the signal COMP may limit the dimming range and/or dimming accuracy.

Figure 5:
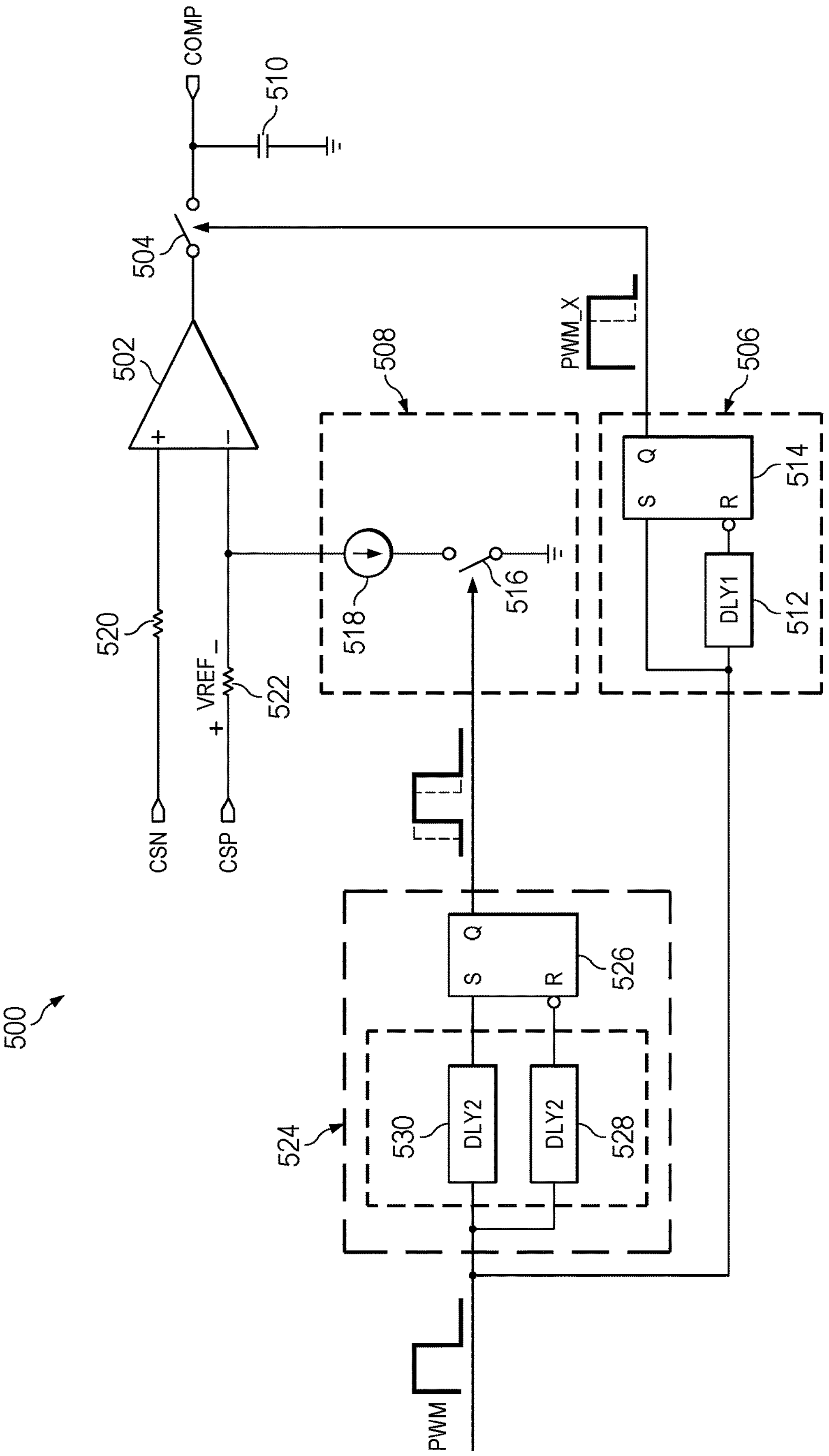
FIG. 5 is a block diagram of an example sampling circuit suitable for use in the boost mode LED driver circuit of FIG. 4.

FIG. 5 is a block diagram of an example sampling circuit 500 suitable for use in the LED dimming circuit 414. The sampling circuit 500 includes an amplifier 502, a switch 504, a pulse extension circuit 506, a reference shaping circuit 508, a capacitor 510, a resistor 520, a resistor 522, and a pulse shifter circuit 524. The resistor 520 is coupled between a first input (e.g., non-inverting input) of the amplifier 502 and the first terminal of the resistor 406. The resistor 522 is coupled between a second input (e.g., inverting input) of the amplifier 502 and the second terminal of the resistor 406. The output of the amplifier 502 is coupled to a first terminal of the switch 504 (a first switch terminal). The amplifier 502 provides an output signal that is the difference of the signals at its inputs (e.g., the voltage across the resistor 106 (VSENSE) compared to a reference voltage (VREF)). A second terminal (a second switch terminal) of the switch 504 is coupled to the capacitor 510. The capacitor 510 is coupled between ground and the second terminal of the switch 504. A control terminal of the switch 504 is coupled to an output the pulse extension circuit 506.

The pulse extension circuit 506 controls the switch 504. The pulse extension circuit 506 closes the switch 504 to sample the output of the amplifier 502, and opens the switch 504 to hold the sample voltage across the capacitor 510. The sample voltage (COMP) across the capacitor 510 is provided to switch control circuit 424 of the controller 412 to adjust the timing of the transistor control signals HSD_ON and LSD_ON. An input of the pulse extension circuit 506 is coupled to a pulse width modulation (PWM) terminal or circuit for receipt of a PWM signal (PWM). The pulse extension circuit 506 delays the trailing edge of the PWM signal. The pulse extension circuit 506 includes a delay circuit 512 and a latch 514. The latch 514 includes a set input, a reset input, and an output. The output of the latch 514 is coupled to the control terminal of the switch 504. The delay circuit 512 delays the PWM signal by a selected delay time. The delay time may be programmable via a communication interface (e.g., a serial bus) or other selection means. An input of the delay circuit 512 is coupled to the PWM terminal and the set input of the latch 514. An output of the delay circuit 512 is coupled to the reset input of the latch 514. When the PWM signal is a logic high, the output signal (PWM_X) of the latch 514 is logic high, and the switch 504 is closed. When the PWM signal is a logic low and the output of the delay circuit 512 is a logic low, PWM_X is a logic low, and the switch 504 is open. Accordingly, PWM_X is set to a logic high at the leading edge of the PWM signal and set to a logic low at the trailing edge of delayed PWM signal provided by the delay circuit 512. The switch 504 remains closed for the delay time after the trailing edge of the PWM signal. The pulse extension circuit 506 may extend the PWM signal by a time computed as:

$$T_{XT,BOOST} = T_{ST} + 2\tau_{SNS} \tag{2}$$

where:

$\tau_{SNS}$ is the time constant of the RC network including the resistor 406 and the capacitor 416; and $$T_{ST} = \frac{1 - D_{SW,BOOST}}{F_{SW} \cdot \text{ripple}\%} \quad (3)$$

where:

$D_{SW,BOOST}$ is the duty cycle of LSD_ON;

$F_{SW}$ is the switching frequency of LSD_ON; and ripple % is the percentage ripple of the inductor current (IL).

The reference shaping circuit 508 is coupled between the second input of the amplifier 502 and a ground terminal. A reference input of the reference shaping circuit 508 is coupled to the second input of the amplifier 502. A reference control input of the reference shaping circuit 508 is coupled to the pulse shifter circuit 524. An output of the reference shaping circuit 208 is coupled to the ground terminal. The reference shaping circuit 508 includes a current source 518 and a switch 516. An input of the current source 518 is coupled to the second input of the amplifier 502. An output of the current source 518 is coupled to a first terminal of the switch 516. A second terminal of the switch 516 is coupled to the ground terminal. A control input of the switch 516 is coupled to the pulse shifter circuit 524.

The pulse shifter circuit 524 controls the switch 516. The pulse shifter circuit 524 opens and closes the switch 516 to shape the reference voltage. A pulse shifter input of the pulse shifter circuit 524 is coupled to a pulse width modulation (PWM) terminal or circuit for receipt of a PWM signal (PWM). A pulse shifter output of the pulse shifter circuit 524 is coupled to the reference shaping circuit 508. The pulse shifter circuit 524 delays the leading and trailing edges of the PWM signal. The pulse shifter circuit 524 includes a delay circuit 528, a delay circuit 530, and a latch 526. The latch 526 includes a set input, a reset input, and an output. The latch output of the latch 526 is coupled to the control terminal of the switch 516. The delay circuit 528 and the delay circuit 530 delay the PWM signal by a selected delay time (e.g., $T_{ST}$ shown in equation (3)). The delay time may be greater than or equal to the discharge time of the inductor 404 and the capacitor 416, and may be programmable via a communication interface (e.g., a serial bus) or other selection means. A delay input of the delay circuit 528 and a delay input of the delay circuit 530 are coupled to the PWM terminal. A delay output of the delay circuit 528 is couped to the reset input of the latch 526, and a delay output of the delay circuit 530 is coupled to the set input of the latch 526.

Figure 6A:
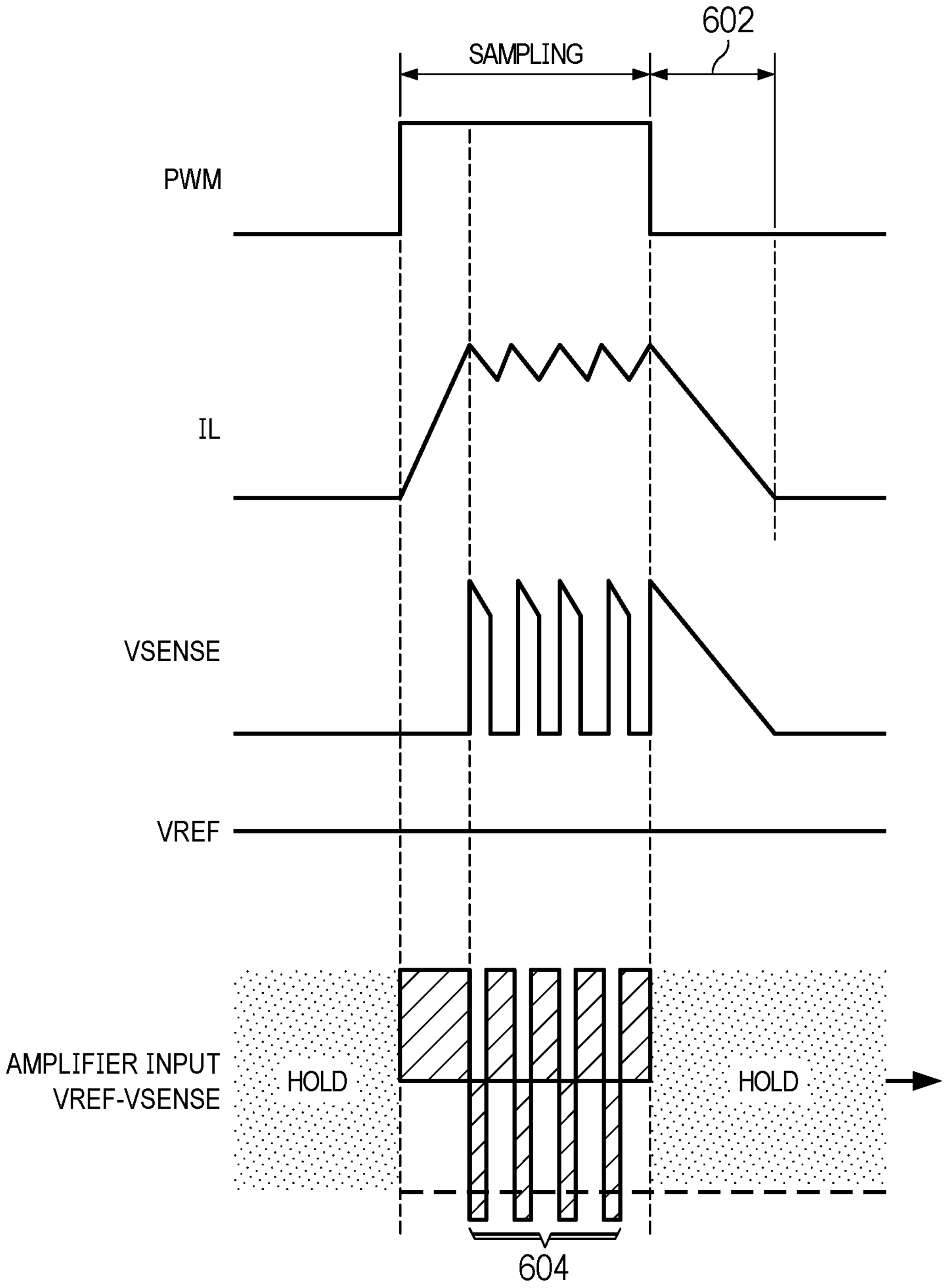
FIGS. 6A and 6B are timing diagrams illustrating sampling in a conventional sampling circuit and in the sampling circuit of FIG. 5.
Figure 6B:
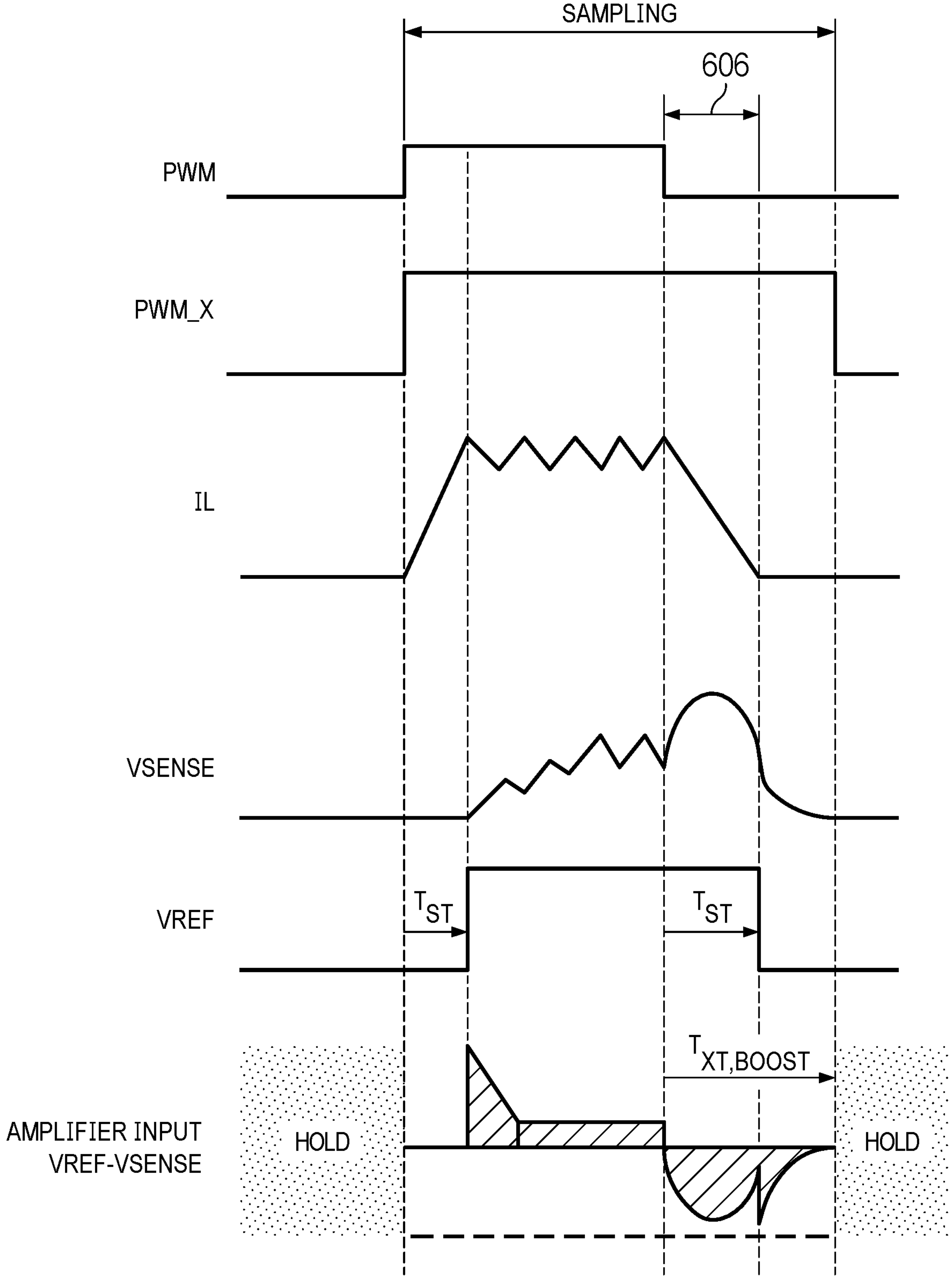

FIGS. 6A and 6B are timing diagrams illustrating sampling in a boost-mode LED driver circuit using a conventional sampling circuit and sampling in the boost-mode LED driver circuit 400 by the sampling circuit 500. FIG. 6A shows the PWM signal, the inductor current (IL), the voltage across the sense resistor (VSENSE), the reference voltage (VREF) provided to the amplifier, and the difference between VREF and VSENSE in the sampling interval (when PWM is high) in a conventional sampling circuit. When PWM is high, current is provided to the LED as pulses (shown in VSENSE). When PWM is low, as in the buck-mode LED driver circuit, current continues to flow to the LED (in interval 602), but is unsampled. When PWM is high, the magnitude of VSENSE exceeds the input saturation boundary of the amplifier (shown in interval 604) resulting in distorted amplifier output that does not accurately represent the difference between VREF and VSENSE. Accordingly, the sampled signal is more distorted in the boost/buck-boost converter than in the buck converter because of the different VSENSE feedback. The amplifier input saturation in the boost/buck-boost converter may cause positive feedback to the current control and make the converter unstable. Single-ended primary-inductor converter (SEPIC) topology and other topologies with buck-boost features face the same issues.

FIG. 6B shows the PWM signal, the extended PWM signal (PWM_X), the inductor current (IL), the voltage across the resistor 406 (VSENSE), the shaped reference voltage (VREF) provided to the amplifier 502, and the difference between VREF and VSENSE in the sampling interval (when PWM_X is high) in the sampling circuit 500. As in FIG. 6A, sampling begins at the leading edge of PWM. The capacitor 416 in parallel with the resistor 406 reduces the magnitude of VSENSE when PWM is high, preventing saturation of the inputs of the amplifier 502. Additional current, after the falling edge of PWM (in interval 606), passes through the capacitor 416 and increases VSENSE. As a result, the inputs of the amplifier 502 may saturate after the falling edge of PWM. The pulse shifter circuit 524 shifts VREF at both rising and falling edges of PWM by a shifting time ($T_{ST}$) equal to or greater than the fall time of IL after the falling edge of PWM to prevent the saturation. The sampling end time (the trailing edge of PWM_X) is extended (delayed_by the time $T_{XT,BOOST}$, which is equal to or greater than the shifting time plus twice the time constant of the RC network including the resistor 406 and the capacitor 416.

The LED drivers 102 and 402 include sampling circuits 200 and 500 that extend sampling time and shape VREF to reduce distortion and increase LED current sampling accuracy. The LED driver 402 also includes the capacitor 416 in parallel with the resistor 406 to increase sampling accuracy in the LED driver 402. The increased sampling accuracy enables high frequency PWM dimming, which reduces audible noise and flickering. Increased sampling accuracy also enables use of narrow PWM pulses, which increases contrast ratio. Reduced distortion increases the stability of the LED driver 102 and LED driver 402 relative to convention LED drivers. Examples of the sampling circuits 200 and 500 may be used in buck, boost, buck-boost, SEPIC, and other converter architectures.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A light emitting diode (LED) dimming circuit comprising:

an amplifier having an amplifier output, a first amplifier input, and a second amplifier input, in which the first amplifier input is coupled to a current sense terminal;

a switch having a first switch terminal, a second switch terminal, and a switch control input, in which the first switch terminal is coupled to the amplifier output; and a pulse extension circuit having an extended pulse output and a pulse input, in which:

the extended pulse output is coupled to the switch control input; and the pulse input is coupled to a pulse width modulation (PWM) terminal; and a reference shaping circuit having a reference input and a reference control input, in which:

the reference input is coupled to the second amplifier input; and the reference control input is coupled to the PWM terminal.

2. The LED dimming circuit of claim 1, wherein:

the switch is a first switch;

the switch control input is a first switch control input; and the reference shaping circuit includes:

a current source having a current input and a current output, in which the current input is coupled to the second amplifier input; and a second switch having a third switch terminal, a fourth switch terminal, and a second switch control input, in which:

the third switch terminal is coupled to the current output;

the fourth switch terminal is coupled to a ground terminal; and the second switch control input is coupled to the PWM terminal.

3. The LED dimming circuit of claim 2, wherein the reference shaping circuit includes:

a pulse shifter circuit having a pulse shifter input and a pulse shifter output, wherein:

the pulse shifter input is coupled to the PWM terminal; and the pulse shifter output is coupled to the second switch control input.

4. The LED dimming circuit of claim 3, wherein the pulse shifter circuit includes:

a first delay circuit having a first delay input and a first delay output, in which the first delay input is coupled to the PWM terminal;

a second delay circuit having a second delay input and a second delay output, in which the second delay input is coupled to the PWM terminal;

a latch having a set input, a reset input, and a latch output, in which:

the set input is coupled to the first delay output;

the reset input is coupled to the second delay output; and the latch output is coupled to the second switch control input.

5. The LED dimming circuit of claim 4, wherein:

the current sense terminal is a first current sense terminal; and the LED dimming circuit includes:

a first resistor coupled between the first amplifier input and the first current sense terminal; and a second resistor coupled between the second amplifier input and a second current sense terminal.

6. The LED dimming circuit of claim 1, wherein the pulse extension circuit includes:

a delay circuit having a delay input and a delay output; and a latch having a set input, a reset input, and a latch output, in which:

the set input is coupled to the PWM terminal;

the reset input is coupled to the delay output; and the latch output is coupled to the switch control input.

7. The LED dimming circuit of claim 1, further comprising a capacitor coupled between the second switch terminal and a ground terminal.

8. The LED dimming circuit of claim 1, further comprising:

a sense resistor having a first resistor terminal and a second resistor terminal, in which:

the first resistor terminal is coupled to the first amplifier input; and the second resistor terminal is coupled to the second amplifier input;

a capacitor having a first capacitor terminal and a second capacitor terminal, in which:

the first capacitor terminal is coupled to the first resistor terminal; and the second capacitor terminal is coupled to the second resistor terminal.

9. A light emitting diode (LED) dimming circuit, comprising:

an amplifier having an amplifier output, a first amplifier input, and a second amplifier input, in which the first amplifier input is coupled to a current sense terminal;

a pulse extension circuit having a pulse input and a pulse output, in which:

the pulse input is coupled to a pulse width modulation (PWM) terminal; and the pulse extension circuit is configured to provide, at the pulse output, an extended PWM pulse by delaying a trailing edge of a PWM pulse received at the pulse input;

a switch having a switch terminal and a switch control input, in which:

the switch terminal is coupled to the amplifier output; and the switch control input is coupled to the pulse output; and a reference shaping circuit having a reference input and a reference control input, in which:

the reference input is coupled to the second amplifier input;

the reference control input is coupled to the PWM terminal; and the reference shaping circuit is configured to draw current from the second amplifier input responsive to the PWM pulse.

10. The LED dimming circuit of claim 9, wherein:

the switch is a first switch;

the switch control input is a first switch control input; and the reference shaping circuit includes:

a second switch having a third switch terminal, a fourth switch terminal, and a second switch control input, in which:

the second switch control input is coupled to the PWM terminal;

the third switch terminal is coupled to a ground terminal; and a current source having a current input and a current output, in which:

the current input is coupled to the second amplifier input; and the current output is coupled to the fourth switch terminal.

11. The LED dimming circuit of claim 10, wherein the reference shaping circuit includes a pulse shifter circuit having a shifter input and a shifter output, in which:

the shifter input is coupled to the PWM terminal;

the shifter output is coupled to the second switch control input; and the pulse shifter circuit is configured to delay the PWM pulse.

12. The LED dimming circuit of claim 11, wherein the pulse shifter circuit includes:

a first delay circuit having a first delay input and a first delay output, in which the first delay input is coupled to the PWM terminal;

a second delay circuit having a second delay input and a second delay output, in which the second delay input is coupled to the first delay input; and a latch having a reset input, a set input, and a latch output, in which:

the reset input is coupled to the first delay output;

the set input is coupled to the second delay output; and the latch output is coupled to the second switch control input.

13. The LED dimming circuit of claim 9, wherein the pulse extension circuit includes:

a delay circuit having a delay input and a delay output, in which the delay input is coupled to the PWM terminal; and a latch having a reset input, a set input, and a latch output, in which:

the set input is coupled to the delay input;

the reset input is coupled to the delay output; and the latch output is coupled to the switch control input.

14. The LED dimming circuit of claim 13 wherein the delay circuit is configured to delay the trailing edge of the PWM pulse based on a duty cycle and a switching frequency of a transistor control signal provided to a high-side transistor of an LED driver.

15. The LED dimming circuit of claim 9, further comprising:

a sense resistor having first and second resistor terminals, in which:

the first resistor terminal is coupled to the first amplifier input;

a second terminal coupled to the second amplifier input;

a capacitor having first and second capacitor terminals, in which:

the first capacitor terminal is coupled to the first resistor terminal; and the second capacitor terminal is coupled to the second resistor terminal.

16. A light emitting diode (LED) circuit comprising:

an LED;

an LED driver including:

a drive output coupled to the LED;

a sense resistor having first and second resistor terminals, in which the first resistor terminal is coupled to the drive output; and an LED dimming circuit including:

an amplifier having an amplifier output, and first and second amplifier inputs, in which:

the first amplifier input is coupled to the first resistor terminal; and the second amplifier input is coupled to the second resistor terminal;

a switch having a switch terminal and a switch control input, in which the switch terminal is coupled to the amplifier output; and a pulse extension circuit having an extended pulse output and a pulse input, in which:

the extended pulse output is coupled to the switch control input; and the pulse input is coupled to a pulse width modulation (PWM) terminal; and a reference shaping circuit having a reference input and a reference control input, in which:

the reference input is coupled to the second amplifier input; and the reference control input is coupled to the PWM terminal.

17. The LED circuit of claim 16, wherein:

the switch is a first switch;

the switch control input is a first switch control input; and the reference shaping circuit includes:

a current source having a current input and a current output, in which the current input is coupled to the second amplifier input; and a second switch having a third switch terminal, a fourth switch terminal, and a second switch control input, in which:

the third switch terminal is coupled to the current output;

the fourth switch terminal is coupled to a ground terminal; and the second switch control input is coupled to the PWM terminal.

18. The LED circuit of claim 17, wherein the reference shaping circuit includes:

a pulse shifter circuit having a pulse shifter input and a pulse shifter output, wherein:

the pulse shifter input is coupled to the PWM terminal; and the pulse shifter output is coupled to the second switch control input.

19. The LED circuit of claim 18, wherein the pulse shifter circuit includes:

a first delay circuit having a first delay input and a first delay output, in which the first delay input is coupled to the PWM terminal;

a second delay circuit having a second delay input and a second delay output, in which the second delay input is coupled to the PWM terminal;

a first latch having a first set input, a first reset input, and a first latch output, in which:

the first set input is coupled to the first delay output;

the first reset input is coupled to the second delay output; and the first latch output is coupled to the second switch control input.

20. The LED circuit of claim 16, wherein:

the pulse extension circuit includes:

a delay circuit having a delay input and a delay output; and a latch having a set input, a reset input, and a pulse output, in which:

the set input is coupled to the PWM terminal;

the reset input is coupled to the delay output; and the pulse output is coupled to the switch control input.

21. The LED circuit of claim 16, further comprising:

a capacitor having first and second capacitor terminals, in which:

the first capacitor terminal is coupled to the first resistor terminal; and the second capacitor terminal is coupled to the second resistor terminal.

* * * * *